Aug. 18, 1925.
F. JORDAN
1,550,261
COMPRESSED AIR SAFETY APPARATUS FOR HOISTS AND THE LIKE
Filed Aug. 23, 1921 2 Sheets-Sheet 2
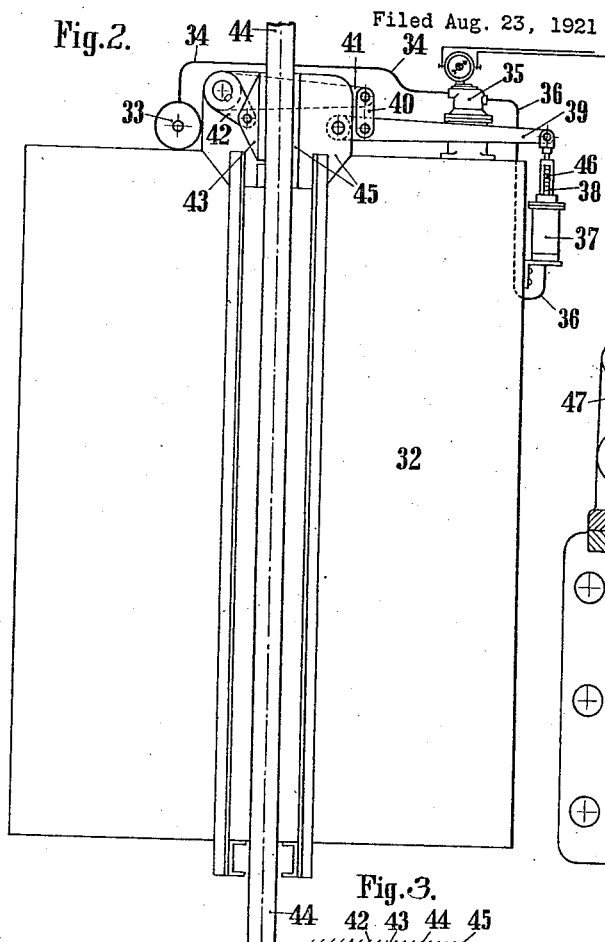
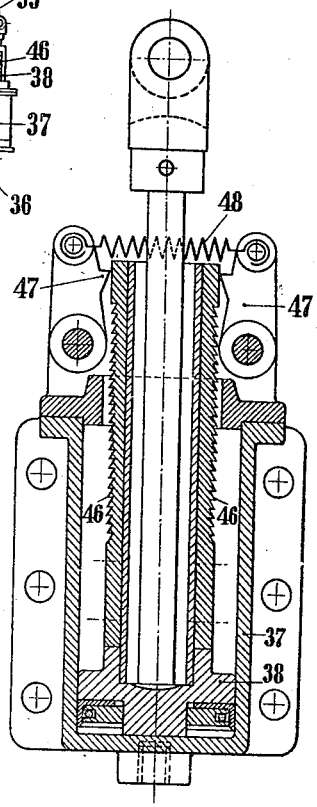
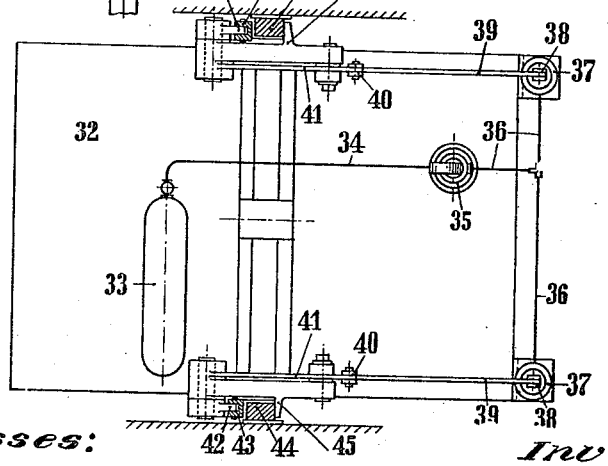
Witnesses:
L. O. Badeau
H. D. Penney
Inventor:
Franz Jordan,
By his Atty, F. H. Richards Patented Aug. 18, 1925.

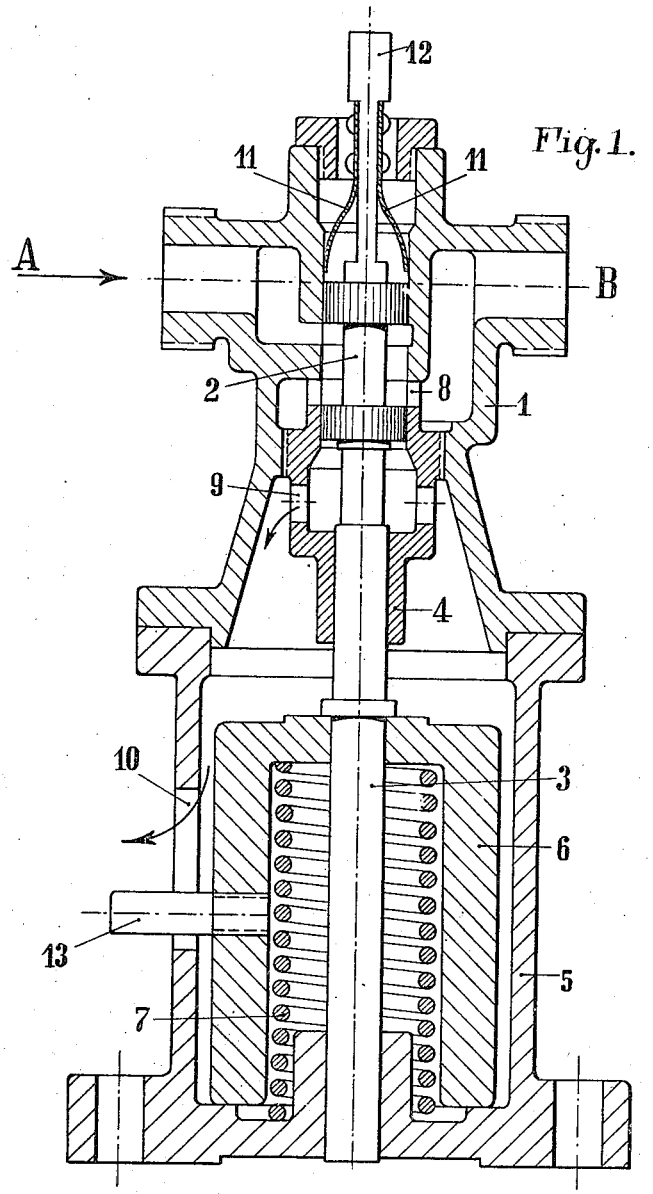

1,550,261

UNITED STATES PATENT OFFICE.

FRANZ JORDAN, OF BERLIN-LICHTERFELDE, GERMANY.

COMPRESSED-AIR SAFETY APPARATUS FOR HOISTS AND THE LIKE.

Application filed August 23, 1921. Serial No. 494,537.

(GRANTED UNDER THE PROVISIONS OF THE ACT OF MARCH 3, 1921, 41 STAT. L., 1313.)

*To all whom it may concern:*

Be it known that I, Dr. FRANZ JORDAN, engineer, a citizen of Germany, residing in Berlin-Lichterfelde, Germany, have invented certain new and useful Improvements in Compressed-Air Safety Apparatus for Hoists and the like (for which I have filed applications in Germany, Oct. 21, 1916, Apr. 25 and 28, 1917, Aug. 16, 1917, Nov. 20, 1917; Austria, Feb. 15, 1918; Sweden, May 30, 1919; Holland, May 31, 1919; Switzerland, June 6, 1919; Denmark, June 14, 1919; France, July 6, 1920; Great Britain, July 9, 1920; Belgium, July 10, 1920; Czechoslovakia, Nov. 27, 1920; and Poland, Nov. 27, 1920), of which the following is a specification.

This invention relates to compressed air safety apparatus for hoists and hauling machines which prevents a car or cage from falling in cases of accidents. The apparatus is such that its effect may be precisely adjusted, does not change during operation, and above all is independent of the vibrations of the rope and the car or cage and of the length of rope left attached to it in the case of a rope failure. In this invention the valve that controls the compressed air is actuated by a force due to acceleration that is produced at the instant of falling by a weight or mass that moves in the direction of travel and that tensions a spring. It will be mentioned here that the idea of using a weight that is counteracted by a spring for influencing the safety brakes of hoists is known. But in distinction from this known arrangement the invention consists in causing this weight to affect the valve of a safety device that is actuated by compressed air, the weight acting either direct through a thrust rod or an equivalent, or indirect through an interposed compressed air relay.

One of the possible embodiments of the invention is described, by way of example, in the subjoined specification and shown in the accompanying drawing forming part of the specification.

Fig. 1 shews a cross-section through a type of safety device which, in accordance with the above description, consists of a gravity body or weight counteracted by a spring and of a compressed air controlling valve affected directly by the said weight. The actual car brake itself may be of any approved type and is not illustrated.

Figs. 2 to 4 represent a preferred manner of carrying out the entire safety apparatus, Fig. 2 showing a side view of the car with the brake and the devices controlling the latter.

Fig. 3 representing a top view of the car or cage with the safety apparatus mounted thereon, and Fig. 4 illustrating a ratchet and pawl device for maintaining the application of the brake after the safety device has taken effect.

The safety device represented in Figure 1 of the drawing is constructed as follows: The compressed air controlling valve is arranged in a casing 1 and consists of a valve piston 2 which rests loosely upon a pressure rod 3. This rod is guided by, and moves freely in, a sleeve 4 inserted in the casing and a hole in the mantle 5 that forms a part of the valve casing. Onto the pressure rod 3 a weight 6 is slipped which forms the gravity body or mass that is accelerated if the car falls. This weight rests upon a spring 7 which is supported at the bottom upon the base of the mantle 5, the spring thus bearing the weight 6 with the pressure rod 3 and the valve piston 2.

The compressed air contained at A in a compressed air reservoir is conducted through the ports 8 of the valve casing to the flanged socket or outlet B to which the cylinder of the brake, which may be of any suitable kind, is connected. Thus in the normal condition the piston of the brake is pressed upward and the brake prevented from acting. But if the rope of the hoist breaks and the car falls, or if excessive acceleration of the car occurs during its downward course from any other cause, the weight 6, which is arranged to move freely, does not immediately move with the same acceleration, but, since it is relieved of the pressure causing acceleration, it is flung upwards by the spring 7 and thus the valve piston 2 is also moved into its upper position. But in this position the compressed air conducted from A to B is cut off and the outlet B or the brake cylinder (not shewn) is connected to the atmosphere instead of through the ports or openings 8, 9 and 10. Thus the air beneath the piston preventing the application of the brake can stream out and the safety device comes into operation, or the brake is applied so that the car is brought to a standstill. When the car stops the weight 6 and the rod 3 drop down again. But on account of the resistance due to friction which is increased by the action of the holding springs 11 the valve piston is kept in its upper position so that the connection between the interior of the cylinder of the brake and the atmosphere is maintained and the brake remains applied. To cause the brake to release its hold the valve piston must be pressed down again and a knob or button 12 is provided for this purpose.

The relation between the spring power 7 and the weight 6 determines the acceleration at which the controlling safety valve causes the safety device to operate.

The apparatus can be tested at any time to ascertain if it is in good working order by lifting the valve with the aid of a pin 13, which is provided for this purpose.

If all practical requirements are to be met a hoist equipped with the safety apparatus hereinbefore described must be provided with a locking device which becomes effective when the safety device has operated and brought the car to a standstill, and which causes the car to be held in its position even if the compressed air that lends its power to the brake should escape during a breakdown of long duration. It would not do to arrange this locking contrivance to be worked by hand because the persons attending to the lift would not be sufficiently certain to put the locking device into operation after an accident. So this must always be done automatically. A solution of this problem is illustrated in Figs. 2 to 4. In accomplishing this solution the inventor set out from known devices by which the locking operation is accomplished automatically with the aid of a ratchet and pawl mechanism, which takes effect the moment pressure is applied by the brakes, and keeps the brakes in operation independently of the compressed air. By the present invention these known devices have been improved inasmuch as the compressed air piston is now not caused to act upon the brake direct but indirect through the medium of links or bars having a certain elasticity and with which the ratchet co-operates in such manner that it keeps the bar in a bent position from the moment the device has operated. By this means the lost motion which cannot be avoided in ratchet and pawl mechanisms is rendered harmless so that perfect safety is attained without necessitating the use of wooden guides or runners into the substance of which brake shoes in the form of gripping members can penetrate.

In the device shown in the drawing the ratchet is connected to the compressed air piston that actuates the above mentioned bar.

On the top of the car 32 a holder or reservoir 33 is placed in which air that is sufficiently compressed is carried by the car. The holder is connected by a pipe 34 to the safety device 35 which contains a compressed air controlling valve and a weight affected by a spring as shown in Fig. 1, or Figs. 2 to 4. If the car drops suddenly from any cause whatsoever the weight establishes a connection in the manner already described between the compressed air pipe 34 and the pipe 36 that leads to the brake cylinders 37. On the compressed air entering these it forces up the pistons 38 to which the brake bars 39, 40, 41, 42 are attached. The brake shoes 43 are then pressed against the guide beam 44 so that these beams are clamped fast between the brake shoes and the heels 45 and the car is brought to a standstill. In their normal position the brake shoes 43 and the heels 45 leave sufficient play to avoid any unintended jamming of the car through skewing whilst working.

The piston 38 of each brake cylinder 37 is equipped with two ratchet bars 46 with the teeth of which two opposite pawls 47 can engage when the piston 38 is pressed upward in order to apply the brake. The pawls are drawn towards each other by springs 48. The brake bar through which the piston actuates the brake shoe is so made as to possess a certain amount of elasticity. Therefore when the air enters the cylinder beneath the piston the brake bar will be raised as far as its elasticity permits, for the compressed air operates at a very high pressure. The pawls 47 then engage with the teeth of the ratchet bar that correspond to this highest position of the brake piston and prevents the piston from receding when the air pressure relaxes. But by the tension due to the elasticity of the brake bar the pawls are kept in engagement with the ratchet teeth behind which they have dropped so that the brake bar is securely locked in its working position. After the repairs have been carried out compressed air is again conducted into the cylinder beneath the piston so as to force the piston upwards as high as possible. The friction between the pawls and the ratchet teeth will then cease so that the pawls may be moved without trouble, against the action of the spring 48, out of engagement with the ratchet bar.

I claim:—

1. In combination with a hoist, a car, a safety brake arrangement comprising a supply of compressed air, a brake actuated by the compressed air, a valve controlling the actuation of the brake by the compressed air, a weight controlling the said valve, and a spring tensioned by the gravity of the said weight, the weight being mounted so as to be movable in a direction parallel to the path of the said car.

2. In combination with a hoist, a car, a safety brake arrangement comprising a supply of compressed air, a brake actuated by the compressed air, a valve controlling the actuation of the brake by the compressed air, a weight controlling said valve, a spring tensioned by the gravity of said weight, the weight being mounted so as to be movable in a direction parallel to the path of said car, and means cooperating with said weight for lifting the valve for testing the apparatus.

3. In combination with a hoist, a car, a safety brake arrangement comprising a supply of compressed air, a brake actuated by the compressed air, a casing, a mantel forming part of the casing, a valve piston for controlling the actuation of said brake by the compressed air, a sleeve, a pressure rod operating in said sleeve for supporting the valve piston, a weight on the pressure rod and within said mantel, and a spring within said weight; said spring being supported upon the base of said mantel and supporting said weight, pressure rod and valve piston.

4. In combination with a hoist, a car, a safety brake arrangement comprising a supply of compressed air, a brake actuated by the compressed air, a casing, a mantel forming part of the casing, a valve piston for controlling the actuation of said brake by the compressed air, a sleeve, a pressure rod operating in said sleeve for supporting the valve piston, a weight on the pressure rod and within said mantel, a spring within said weight, the spring being supported upon the base of said mantel and supporting said weight, pressure rod and valve piston, and a pin insertible through the wall of the mantel and engageable with said weight for lifting said valve for testing the apparatus.

5. In combination with a hoist, a car, a safety brake arrangement comprising a supply of compressed air, a brake actuated by the compressed air and having a cylinder communicatible with the atmosphere, a casing, a mantel forming part of the casing, a valve piston for controlling the actuation of said brake by the compressed air, a sleeve, a pressure rod operating in said sleeve for supporting the valve piston, a weight on the pressure rod and within said mantel, a spring within said weight, the spring being supported upon the base of said mantel and supporting said weight, pressure rod and valve piston, means cooperating with the valve piston whereby the valve piston is held in position for maintaining connection between said cylinder of the brake and the atmosphere when the brake is applied, and means for releasing the first mentioned means for releasing the brake from applied position.

6. In combination with a hoist, a car, a safety brake arrangement comprising a supply of compressed air, a brake, a valve controlling the actuation of the brake by the compressed air, a weight controlling the said valve, a spring tensioned by the gravity of the said weight, the weight being mounted so as to be movable in a direction parallel to the path of the said car, a flexible bar attached to the said brake and adapted to bend when the brake is applied, and a ratchet mechanism adapted to hold the flexible bar in its operative position when the brake is applied.

In witness whereof I have hereunto signed my name this 27th day of July 1921.

FRANZ JORDAN.